United States Patent
Lunegov (10) Patent No.: US 12,094,258 B2
(45) Date of Patent: Sep. 17, 2024

(54) VEHICLE DATA CAPTURE AND DISPLAY SYSTEM

(71) Applicant: Evgeny Lunegov, Celebration, FL (US)

(72) Inventor: Evgeny Lunegov, Celebration, FL (US)

(*) Notice: Subject to any disclaimer, the term of this patent is extended or adjusted under 35 U.S.C. 154(b) by 385 days.

(21) Appl. No.: 17/479,857

(22) Filed: Sep. 20, 2021

(65) Prior Publication Data

US 2022/0092890 A1   Mar. 24, 2022

Related U.S. Application Data

(60) Provisional application No. 63/082,310, filed on Sep. 23, 2020.

(51) Int. Cl.
*G07C 5/00* (2006.01)
*G06V 20/56* (2022.01)
*G07C 5/08* (2006.01)

(52) U.S. Cl.
CPC .............. *G07C 5/008* (2013.01); *G06V 20/56* (2022.01); *G07C 5/0808* (2013.01); *G07C 5/0825* (2013.01); *G07C 5/0833* (2013.01)

(58) Field of Classification Search
CPC ...... G06T 2207/30252; G07C 2205/02; G07C 5/0808; G06V 20/56
See application file for complete search history.

(56) References Cited

U.S. PATENT DOCUMENTS

| | | | |
|---|---|---|---|
| 6,257,054 B1 | 7/2001 | Rostkowski et al. | |
| 6,370,891 B1* | 4/2002 | Marshall | G05D 23/1905 236/94 |
| 10,475,208 B1* | 11/2019 | Morrison | G06V 20/52 |
| 2002/0128985 A1* | 9/2002 | Greenwald | G06Q 30/0283 705/400 |
| 2005/0254926 A1* | 11/2005 | Howison | B66F 7/28 414/495 |
| 2008/0209994 A1* | 9/2008 | Matsumoto | G01L 5/167 73/117.01 |
| 2021/0173018 A1* | 6/2021 | Koo | G01K 3/005 |
| 2021/0302270 A1* | 9/2021 | Seetharaman | G07C 5/0808 |

* cited by examiner

*Primary Examiner* — Khoi H Tran
*Assistant Examiner* — Tristan J Greiner
(74) *Attorney, Agent, or Firm* — Jason T. Daniel, Esq; Daniel Law Offices, P.A.

(57) ABSTRACT

A system for capturing and displaying vehicle data includes a vehicle data capture system having a pair of elongated platforms for receiving a subject vehicle, a plurality of cameras and microphones, and a series of dynamometer units for capturing vehicle images, sounds, and performance information. An interior data capture unit includes a portable camera and microphone, an OBD scanner and temperature sensor for capturing information from the interior of the subject vehicle. A system controller is communicatively linked to a platform provider over a network and sends the captured vehicle data. The platform provider includes functionality for receiving the vehicle data from the system controller, and for communicating with a third party data provider to receive additional data pertaining to a subject vehicle. All received data is provided as a comprehensive vehicle report and submitted to a client interface device.

19 Claims, 5 Drawing Sheets

VEHICLE DATA CAPTURE AND DISPLAY SYSTEM

CROSS-REFERENCE TO RELATED APPLICATIONS

This application claims the benefit of U.S. Application Ser. No. 63/082,310 filed on Sep. 23, 2020, the contents of which are incorporated herein by reference.

TECHNICAL FIELD

The present invention relates generally to the automotive industry, and more particularly to a system and method for capturing comprehensive information about a motor vehicle for storage and dissemination to third parties.

BACKGROUND

The statements in this section merely provide background information related to the present disclosure and may not constitute prior art.

When purchasing a vehicle, customers want as much information as possible before visiting the dealership. This is especially true due to recent infectious pandemics such as COVID-19, for example, where individuals prefer to avoid crowded places and keep in-person contacts to a minimum. For these and other reasons, there are an increasing number of dealerships who are selling vehicles in part, or exclusively via their website.

In this regard, these dealerships provide a listing of their vehicle inventory on their website, in order to allow potential customers to view information prior to visiting the dealership and/or prior to purchasing through the site. As such, most of these sites provide basic information such as a photograph of the outside and inside of the vehicle, along with a brief written description explaining the vehicle equipment (e.g., power steering, satellite navigation, satellite radio, etc.) Although useful for providing information at a glance, these listings are woefully insufficient compared to what a potential customer would experience if they were to actually visit the dealership and view the vehicle in person.

As a result, most customers end up calling the dealership to ask a salesperson to provide additional data, such as photographs of specific vehicle components (e.g., engine, trunk, chassis, tires, etc.), accident reports and the like. Obtaining this information on demand is time consuming and is often repeated by different sales personnel in response to similar questions by other potential customers.

Accordingly, it would be beneficial to provide a system for capturing uniform and comprehensive data about a subject vehicle that can be used by dealerships to provide a comprehensive vehicle listing to their customers, so as to alleviate the drawbacks described above.

SUMMARY OF THE INVENTION

The present invention is directed to a system for capturing vehicle data. One embodiment of the present invention can include a vehicle data capture system that is communicatively linked to a platform provider over a network. The platform provider can include functionality for receiving vehicle data from the system, and for communicating with a third-party data provider to receive additional data pertaining to a subject vehicle. This information can be generated into a comprehensive vehicle report for submission to a client device.

In one embodiment, the data capture system can include a pair of elongated platforms, for receiving a subject vehicle. A plurality of cameras and microphones can be positioned about the platforms and can function to capture audiovisual information pertaining to the exterior of the subject vehicle. In one embodiment, a series of dynamometer units can be disposed along the platforms and can capture vehicle driving and performance information.

In one embodiment, an interior data capture unit can include a portable camera and microphone, an OBD scanner and temperature sensor for capturing information from the interior of the subject vehicle, and a system controller is in communication with each of the cameras, microphones, dynamometer units and interior data capture unit.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "unit" means a series of identified physical components which are linked together and/or function together to perform a specified function.

As described herein, the term "System Administrator" and "Platform Provider" can be used to describe any individual, group or legal entity that is performing the below described system administration, in furtherance of the methodology described herein. In one embodiment, the platform provider can be an independent third-party company providing services to any number of different automotive dealerships/clients for use with their customers. In another embodiment, the platform provider can be a dealership itself.

As described herein, the term "captured vehicle data" shall include any and all data that is captured by the below described vehicle data capture system 20 about a subject vehicle. Several nonlimiting examples of captured vehicle data includes, but is not limited to, audiovisual information showing the complete exterior and interior of the subject vehicle, sensor data pertaining to the subject vehicle, diagnostic information captured from the subject vehicle, along with driving and test results of the subject vehicle, among others, for example.

As described herein, "third-party data" can refer to any information about a subject vehicle that is provided to the platform provider from a source other than the vehicle data capture system. Several non-limiting examples of third-party data includes, but is not limited to, accident information, vehicle service information, manufacturer recall information, public record information, lemon law information, insurance information, comparative pricing information, and the like, for example.

As described herein, a "third-party data provider" can include any company that provides third party data to the platform provider and/or receives vehicle data from the platform provider. Several nonlimiting examples of third-party data providers include, but are not limited to Carfax, Dealer Center, Bluebook, Car Gurus, Autotrader, Auto Check, and the like, for example.

As described herein, the term "vehicle report" refers to a cumulative report that can be generated by the platform provider containing the captured vehicle data and the third-party data.

Figure 1:
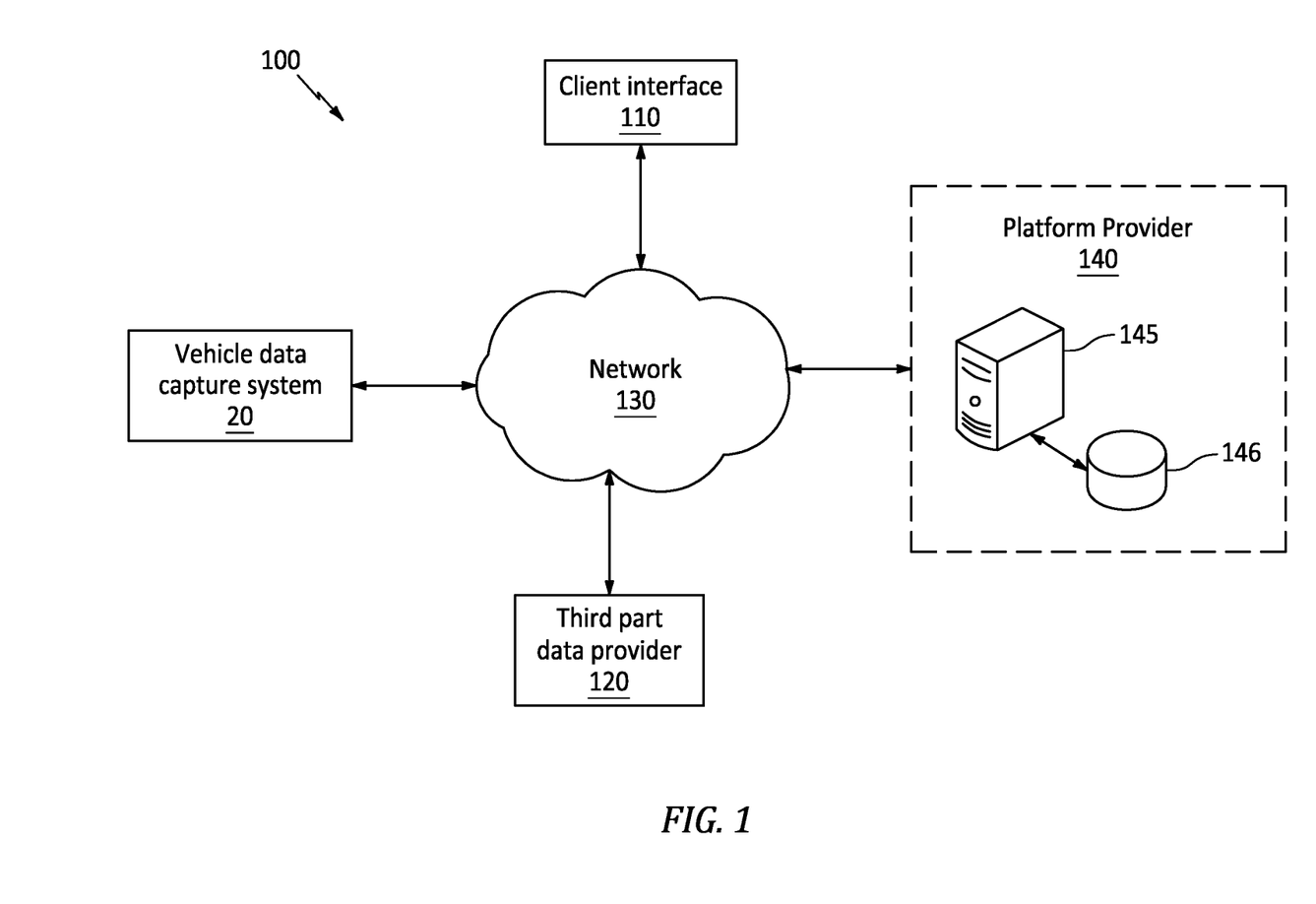
FIG. 1 is an exemplary operating environment of one embodiment of the vehicle data capture and display system that is useful for understanding the inventive concepts disclosed herein.

FIG. 1 is a schematic illustration of an exemplary operating environment 100 for implementing a vehicle data capture and display system. In one embodiment, the environment 100 can include a vehicle data capture system 20, a client interface device 110, and at least one third party data provider interface device 120 that can be connected over a network 130 with the platform provider 140.

The network 130 can be any type of network, including a cellular network, local area network ("LAN"), such as an intranet, a wide area network ("WAN"), the internet, and/or any other type of data transmission and reception medium.

Each of the interface devices 110, 120, and the below described Platform provider server 145, and data capture system controller 50 can be any type of computing device that is operable by a human user. A computing device refers to any device with a processor and memory that can execute instructions and communicate with another device. Computing devices include, but are not limited to, server systems, personal computers, smartphones, tablet computers, laptop computers and/or purpose-built machines that are pre-encoded with an application interface, so as to perform the functionality so described. In either instance, each of the computing devices can include one or more client applications, such as an internet browser, and/or an application interface, for example, which can allow the device to communicate with other interface devices and/or the Platform Provider 140.

The Platform Provider 140, according to one embodiment, can include one or more interface devices 145 (e.g., a platform provider server) that can be connected to one or more databases 146 on which various portions of the below described methodology can be performed. The platform provider 140 can function to provide a central hub for controlling the communication between the system components through any number of different mediums such as a website, a mobile application, a secure application, or electronic communications/emails, for example. In this regard, one or more of the individual computing devices 145 can include various web servers, email servers, application database servers and so forth.

The database 146 can function to store any type of data, including the system operating instructions for facilitating communication between the device components, routing information and/or generating presentation screens for implementing the below described methodology. To this end, the database can include any type of computer-readable storage mediums, including all forms of volatile and non-volatile memory such as, for example, semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD.

As will be described below, the vehicle data capture system 20 can be used to capture vehicle data. The vehicle data can be sent to the Platform provider, which can also collect additional vehicle information from the third-party data providers. Once received, the Platform Provider can generate a comprehensive vehicle report which can be sent to the client. In the illustrated embodiments, the "client" would be a dealership or other entity that is offering a subject vehicle for sale to an end customer. As such, the client can be provided with options for selectively sharing the entire vehicle report, or portions thereof directly to an end customer or to a third-party data provider which offers sale listings to end customers.

In either instance, the system is designed to provide an end user with comprehensive data about a vehicle to allow them to make an informed decision using their own interface device without the need to actually call or visit the dealership where the vehicle is located. Such a feature beneficially reducing the workload on dealership sales personnel and increasing the likelihood the customer will purchase the vehicle online.

Figure 2:
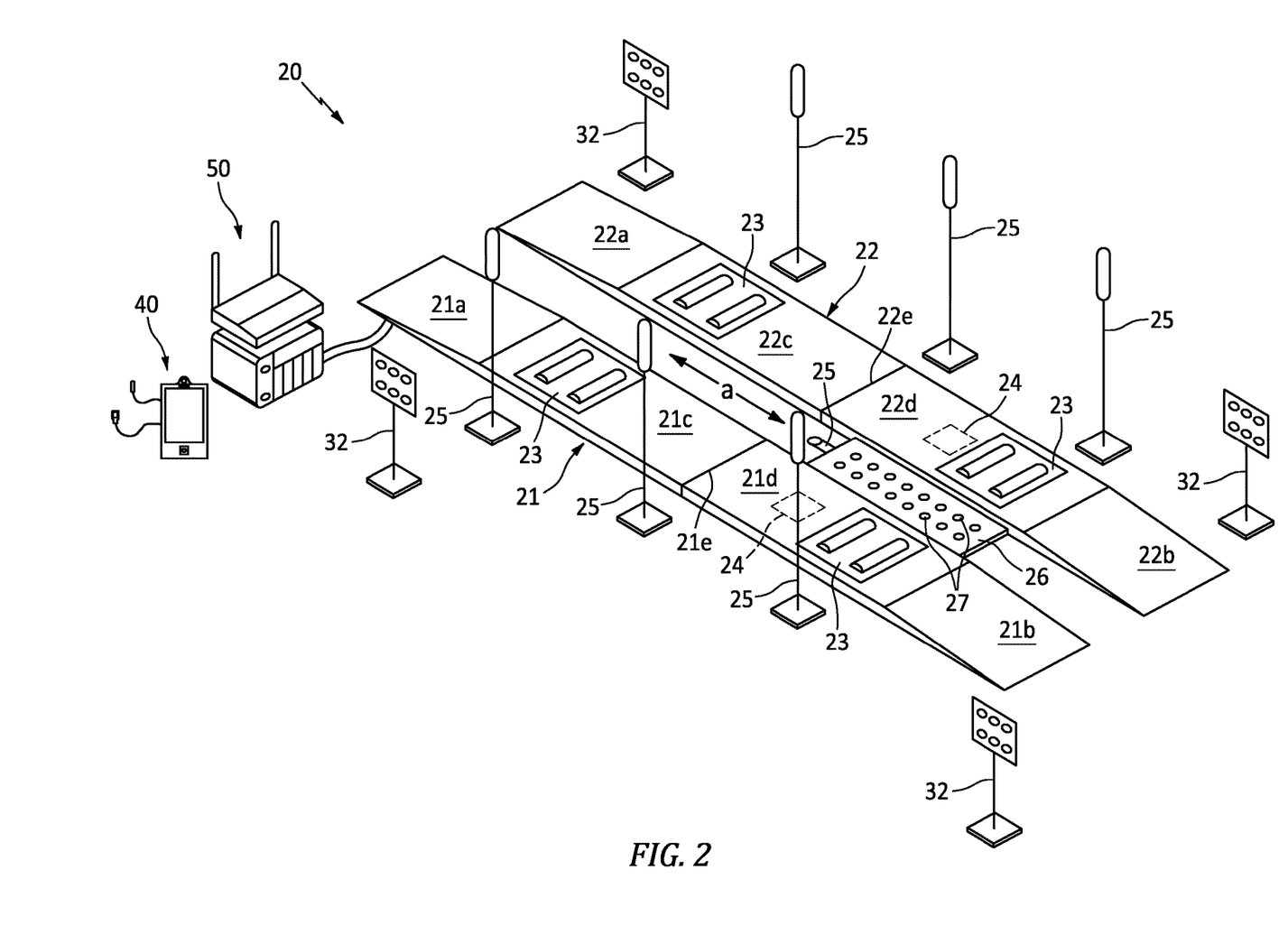
FIG. 2 is a perspective view of one embodiment of the vehicle data capture system, in accordance with one embodiment of the invention.

As shown best at FIG. 2, one embodiment of the vehicle data capture system 20 can include a pair of elongated flat platforms 21 and 22, each having a ramp 21a/22a and 21b/22b along each end. Such a feature allowing a vehicle 5 to be physically driven onto the scaffolds to undergo examination. In the preferred embodiment, each of the scaffolds can be constructed from rugged materials such as metal, for example, and can function to raise the vehicle at least 1 foot from the ground. Of course, other embodiments are contemplated wherein the scaffolds are constructed from different materials and/or include different heights.

In one embodiment, each of the platforms can be constructed from two sections 21c/21d and 22c/22d that are telescopically joined along seams 21e and 22e. In this regard, sections 21c and 22c can include a hollow interior for permitting a portion of sections 21d and 22d, respectively to extend from and retract into the hollow portions, so as to allow a user to selectively increase or decrease the overall length of the platforms as shown by arrow a. Such a feature allowing a user to securely position each wheel of a subject vehicle onto the below described dynamometer units of the system. Of course, other embodiments are contemplated wherein the platforms are extendable through the use of additional sections and/or include a fixed orientation.

In one embodiment, the platforms can comprise a chassis dynamometer having a plurality of dynamometer units 23 positioned along each end of the platforms 21 and 22. Each of the dynamometer units including a pair of rollers that are connected to a power absorption unit, which in turn is connected to the below described data system controller 50. Such a feature allows the system to capture vehicle driving and performance information such as acceleration, torque, and braking statistics for each wheel of a subject vehicle during an inspection procedure, along with allowing the user to capture audiovisual information about the vehicle during a driving operation.

Chassis dynamometers and their associated components are well known in the art. One suitable example of a chassis dynamometer system that can be incorporated into the vehicle data capture system 20 is described in U.S. Pat. No. 6,257,054, to Rostkowski, the contents of which are incorporated herein by reference. Of course, any number of other such systems are also contemplated for use herein. Additionally, although illustrated with regard to four individual units, other embodiments are contemplated wherein only two units are provided. Such a feature being specific for use with two-wheeled vehicles only.

In one embodiment, each of the platforms 21 and 22 can include at least one vibration sensor 24 which can function to detect vibrations generated by a vehicle during an inspection procedure and report the same to the system controller 50.

In one embodiment, the system 20 can include a plurality of exterior cameras 25 that can be arranged at any number of different locations suitable to record every exterior portion of a vehicle undergoing examination from all sides, including the vehicle undercarriage. As shown, some of the cameras can be mounted on stands, whereas others can be mounted directly onto the platforms themselves. Each of the cameras 25 can include any type of image capture device including a 360 degree-type camera system having an onboard motor and gimbals for moving and panning the camera to capture comprehensive images along and across a 360-degree region.

Each of the cameras can be in communication with the system controller and can function to capture still images, moving images and sounds emanating from the exterior of the vehicle during an inspection process. In various embodiments, the cameras will comprise of digital cameras for capturing images in the visual spectrum; however other embodiments are contemplated wherein at least one of the cameras includes functionality for capturing images in the infrared spectrum. Such a feature allowing the system to detect air conditioning and/or heating leaks escaping from the vehicle cabin, thus denoting an issue with weatherproofing.

Although illustrated at particular locations along the platforms and/or described with regard to a combination camera and microphone, this is for illustrative purposes only. To this end, embodiments are contemplated wherein separate cameras and microphone devices are arranged at any location suitable for capturing any type of desirable vehicle data.

In one embodiment, an enlarged pan 26 can be positioned between the platforms 21 and 22, so as to be located beneath the engine of a vehicle undergoing inspection by the system 20. As described herein, the pan can include at least one leak detection sensor 27 such as a moisture sensor, for example, that is connected to the system controller. In operation, the leak detection sensor can function to detect whether any fluids leak from the engine during vehicle inspection.

Figure 3:
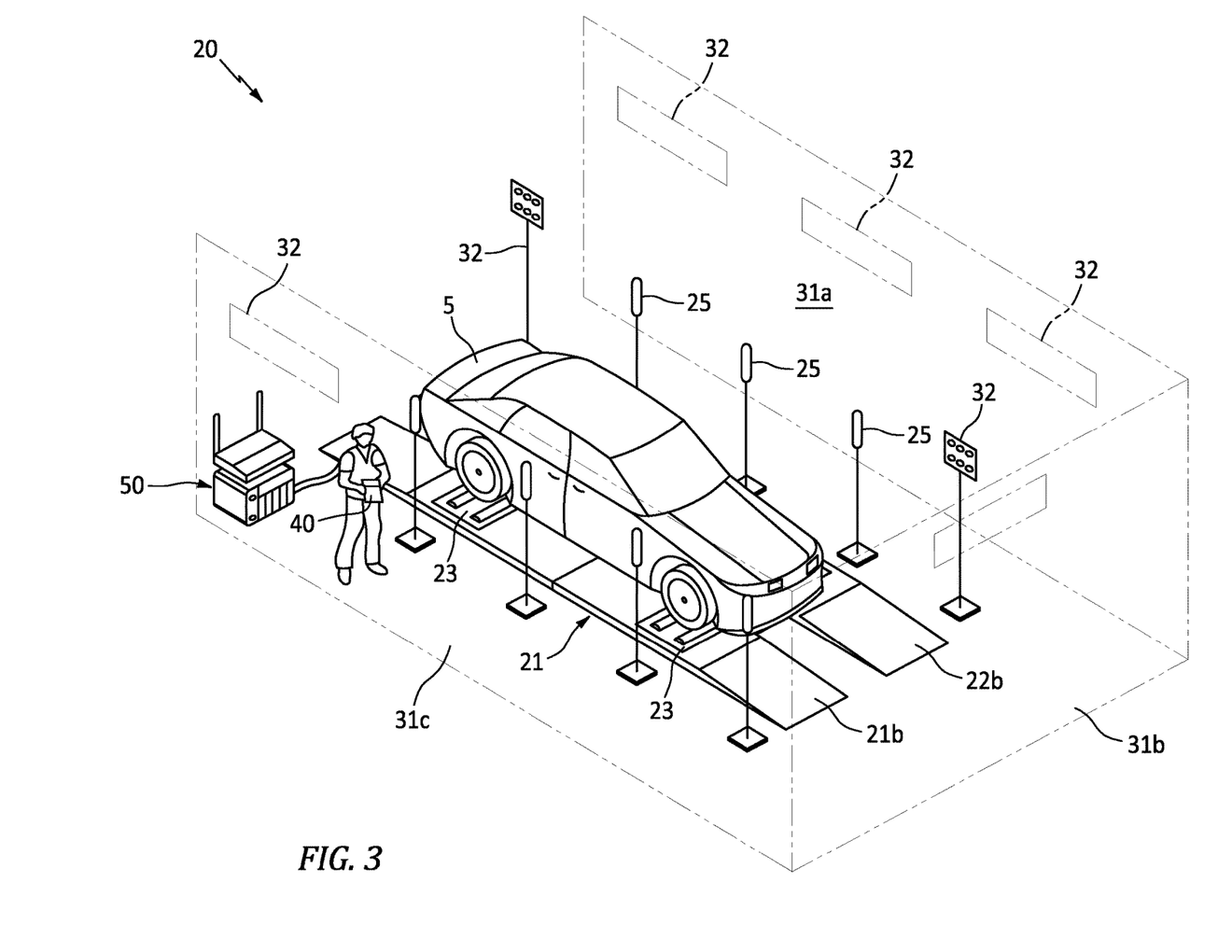
FIG. 3 is a perspective view of one embodiment of the vehicle data capture system in operation, in accordance with one embodiment of the invention.

As shown at FIG. 3, one embodiment of the system 20 can also include a plurality of walls 31a, 31b and 31c, for example, that are spaced a uniform distance from the platforms. In the preferred embodiment, each of the walls will comprise a solid color such as white, for example, to aid in photographing the vehicle, and to ensure all vehicles undergoing inspection have the same background. In various embodiments, the walls and platform can be permanent in nature (e.g., permanently secured within a building) so as to permit continued use over time. In other embodiments, each of the platforms and the walls can be portable in nature (e.g., not physically secured to or within a building) so as to permit the entire system to be moved from one location to another. In such an embodiment, the walls can each comprise individual free-standing segments.

Such a feature being particularly advantageous for allowing the system to be setup at locations such as auto auctions or to be brought to individual dealerships to capture vehicle data for a fleet of vehicles at a single time. Although illustrated with three wall sections, this is for illustrative purposes only, as additional wall segments can be provided so as to completely encompass the vehicle.

In either instance, a plurality of lights 32 can be disposed along the walls 31 and/or can be freestanding and/or attached to the platforms in order to fully illuminate the exterior and the interior of a subject vehicle 5 placed on the platforms 21 and 22 undergoing inspection. As described herein, any number of individual lights can be provided at any location along the booth, the platform, the portable walls and individually via light stands, for example. The lights can include any number of light producing devices such as incandescent, fluorescent and/or LED-type lighting fixtures, for example.

Figure 4:
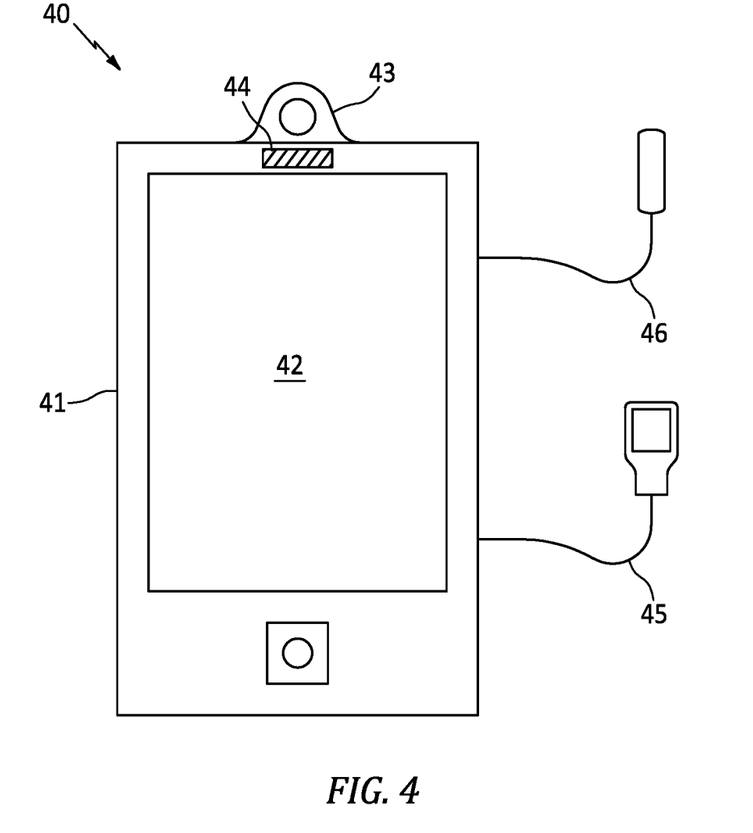
FIG. 4 is a perspective view of the interior of the vehicle data capture unit in accordance with one embodiment of the invention.

As shown at FIG. 4, one embodiment of the interior data capture unit 40 can include an interface device 41 such as a tablet computer, for example, having a wired or wireless communication unit, a display screen 42, a camera 43, and a microphone 44. The device 40 can function to allow a user to capture vehicle data from the interior of a subject vehicle, and communicate the same to the system controller 50. In one embodiment, the device 41 can include an application which provides a detailed series of steps/instructions for which the user is to follow in order to capture uniform and consistent vehicle data for the inside of a subject vehicle.

For example, a user can utilize the camera 43 of the device to capture a complete set of still and moving images of the interior of a subject vehicle, including the VIN sticker, mileage and other such information. Likewise, the microphone 44 can be used to capture audio information from the vehicle such as the interior warning alarm, radio, air conditioning noise and road noise within the vehicle during the driving test using the dynamometer.

In one embodiment, an on-board diagnostics (OBD) scanner 45, can be wired or wirelessly connected to the device 41 and can function to engage the OBD port of the vehicle in order to retrieve any stored vehicle data such as error messages and alerts.

In one embodiment, a temperature sensor 46 such as a wired or wireless thermocouple, for example, can be connected to the device 41 and can function to capture HVAC readings to ensure the vehicles air and heating systems are functioning properly.

Of course, any number of other sensors and components may also be provided. For example, although described as utilizing a camera and microphone that is integrated into the device 41, this is for illustrative purposes only, as other embodiments are contemplated wherein a standalone camera, such as a 360-degree camera system (described above with regard to element 25) is wired or wirelessly connected to the device 41 for capturing audiovisual information for submission to the system controller 50.

Figure 5:
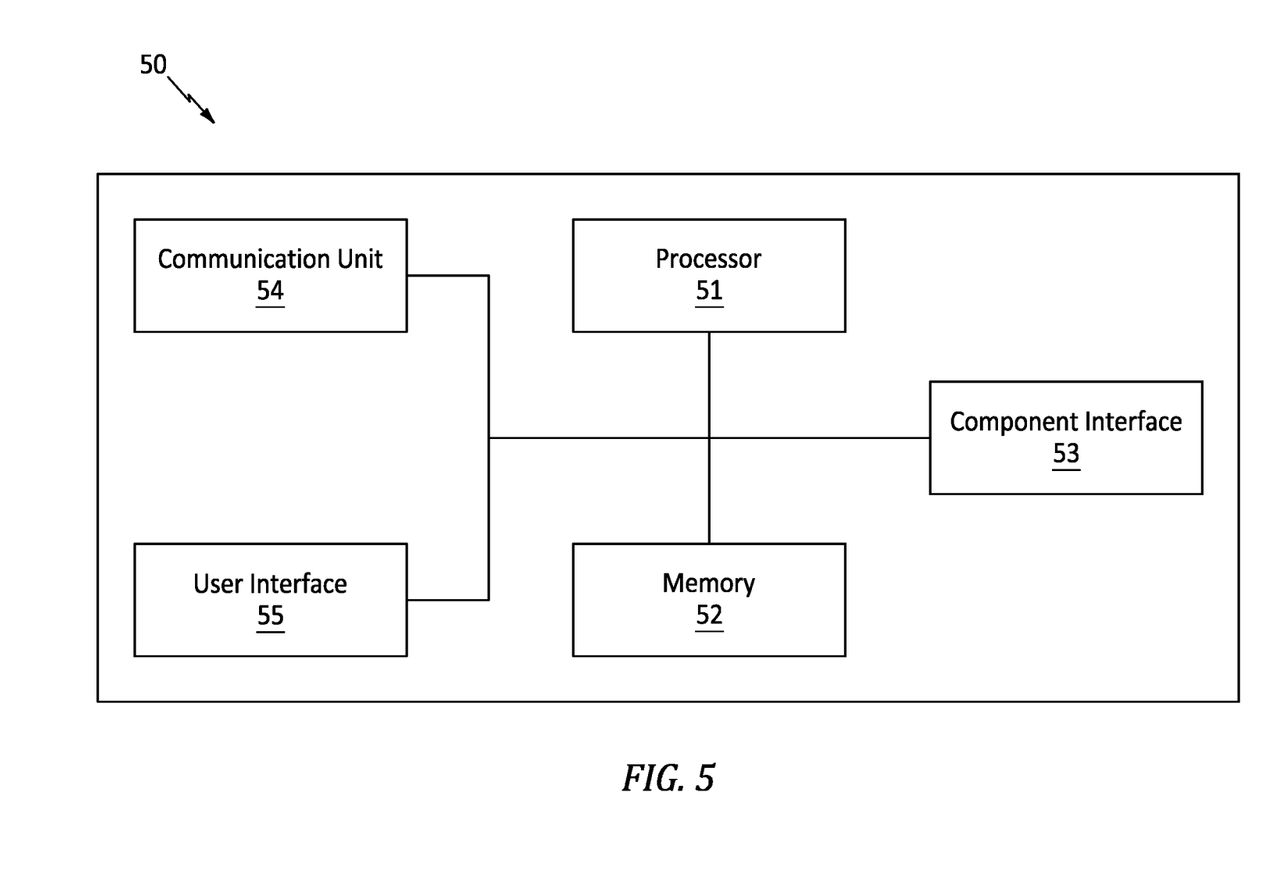
FIG. 5 is a simplified block diagram of the system controller of the vehicle data capture system in operation, in accordance with one embodiment of the invention.

The system controller 50 can function to engage each of the system components and communicate with the platform provider over the internet. In one embodiment, the system controller can include a computing device, such as a personal computer or a server, for example.

As shown at FIG. 5, one embodiment, the controller 50 can include a processor 51 that is conventionally connected to an internal memory 52, a component interface 53, a wireless transceiver 54, and a user interface 55.

Although illustrated as separate elements, those of skill in the art will recognize that one or more system components may comprise or include one or more printed circuit boards (PCB) containing any number of integrated circuit or circuits for completing the activities described herein. Of course, any number of other analog and/or digital components capable of performing the below described functionality can be provided in place of, or in conjunction with the below described controller elements.

The processor 51 can be a conventional central processing unit (CPU) or any other type of device, or multiple devices, capable of manipulating or processing information such as program code stored in the memory 52 and for causing the circuitry to complete the activities and functionality described herein.

Memory 52 can act to store operating instructions in the form of program code for the processor 51 to execute, along with data captured by the system components connected to the component interface 53. Although illustrated in FIG. 5 as a single component, memory 52 can include one or more physical memory devices such as, for example, local memory and/or one or more bulk storage devices. As used herein, local memory can refer to random access memory or other non-persistent memory device(s) generally used during actual execution of program code, whereas a bulk storage device can be implemented as a persistent data storage device such as a hard drive, for example, containing programs that permit the processor to perform the functionality described below. Additionally, memory 25*b* can also include one or more cache memories that provide temporary storage of at least some program code in order to reduce the number of times program code must be retrieved from the bulk storage device during execution. Each of these devices are well known in the art.

The component interface 53 can function to provide a communicative link between the processor 41 and the system components such as the dynamometers 23, vibration sensors 24, cameras 25, leak sensors 27, lights 32 and interior data capture unit 40. In this regard, the component interface unit can include any number of different components such as communication cables and/or wireless transceivers such as Bluetooth or WIFI, for example, capable of performing wireless communication with the system components. Of course, any other means for providing the two-way communication between the identified components can also be utilized herein.

The communication unit 54 can include any number of components capable of sending and/or receiving electronic signals with an externally located device, either directly or over a network. To this end, the communication unit can include a wireless or wired network card, and/or a cellular transceiver, for example, for communicating with the Platform Provider Server 145 via the network 130.

The user interface 55 can function to accept user inputs for controlling the operation, the system controller and each of the system components via the component interface. To this end, the user interface can include one or more of a display screen, keyboard, touchscreen display, speakers, microphone and the like.

Although described above as including a separate system controller 50 and portable interface device 41, other embodiments are contemplated wherein these components can be performed by the same device. To this end, the portable interface device can function as the system controller 50 and/or can function as the user interface device of the separate system controller 50.

In either instance, the above-described system functions to provide a system for capturing comprehensive vehicle data for submission to a centralized platform provider. Upon receipt of the captured vehicle data, the platform provider can query any number of third-party data providers to retrieve additional third-party data about the vehicle. This information can be merged to form a comprehensive vehicle report which can be sent to the platform provider client.

Depending on the arrangement, the client may be an automotive dealership subscribing to the platform provider, or the provider and dealership may be the same entity. In either instance, the client can determine which portions of the vehicle report to show to perspective customers visiting the dealer website or a third-party site from which the client sells vehicles.

Additionally, the report can aid the dealer in identifying comparative sales in order to price the vehicle for a quick sale based on current market conditions and/or regional considerations.

Although described above with regard to an automobile, those of skill in the art will recognize that other types of vehicles such as motorcycles, ATV's, snowmobiles, boats, aircraft and the like may also benefit from the inventive system which can be used to capture associated data without undue modifications or experimentation.

As described herein, one or more elements of the vehicle data capture system 20 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A system for capturing vehicle data, comprising:
   a pair of elongated platforms, each of the platforms having a first end and a second end;
   at least one exterior camera that is oriented toward the pair of elongated platforms, said at least one camera being configured to capture an image of a vehicle located on the pair of elongated platforms;
   at least one exterior microphone that is oriented toward the pair of elongated platforms, each of the at least one microphone being configured to capture an engine sound emanating from the vehicle located on the pair of elongated platforms;
   a plurality of vibration sensors that are positioned onto at least one of the elongated platforms, said vibration sensors being configured to detect a vibration of the vehicle located on the pair of elongated platforms;
   a pan that is positioned between the pair of elongated platforms;
   a liquid sensor that is positioned within the pan, said liquid sensor being configured to detect a fluid leak from the vehicle located on the pair of elongated platforms;
   an interior data capture unit having an interface device that is in communication with a portable camera and a portable microphone that are configured to capture audiovisual information from an interior of the vehicle located on the pair of elongated platforms; and
   a system controller that includes functionality for receiving data from each of the at least one exterior camera, the at least one exterior microphone and the interior data capture unit, the vibration sensors and the liquid detection sensor, and for sending the captured vehicle data to an external device.

2. The system of claim 1, wherein the at least one exterior camera comprises a plurality of cameras that are positioned so as to capture an entirety of an outside surface of the vehicle located on the pair of elongated platforms.

3. The system of claim 2, wherein the at least one exterior camera includes a first camera that is positioned between the pair of elongated platforms and is configured to capture an entirety of an undercarriage of the vehicle.

4. The system of claim 2, wherein the at least one exterior camera includes a 360-degree camera system.

5. The system of claim 1, further comprising:
   a plurality of dynamometer units that are disposed along the pair of elongated platforms and that are in communication with the system controller.

6. The system of claim 5, wherein the plurality of dynamometer units includes two units each having two rollers for capturing acceleration, torque and braking information from a two-wheel vehicle.

7. The system of claim 5, wherein the plurality of dynamometer units includes four units each having two rollers for capturing acceleration, torque and braking information from a four-wheel vehicle.

8. The system of claim 1, wherein the interior data capture unit further includes functionality for capturing vehicle information from an on-board diagnostics unit of the vehicle.

9. The system of claim 8, further comprising:
   an on-board diagnostics scanner that is connected to the interface device of the interior data capture unit.

10. The system of claim 1, wherein the interior data capture unit further includes functionality for capturing a temperature output of an HVAC system of the vehicle.

11. The system of claim 10, further comprising:
    a temperature sensor that is connected to the interface device of the interior data capture unit.

12. The system of claim 1, further comprising:
    a platform provider server that is in communication with the system controller over a network.

13. The system of claim 12, wherein the platform provider server includes functionality for receiving the captured vehicle data from the system controller.

14. The system of claim 13, wherein the platform provider includes functionality for communicating with a third party data provider to capture third party data pertaining to the vehicle for which the captured vehicle data was provided.

15. The system of claim 14, wherein the platform provider includes functionality for generating a vehicle report containing the captured vehicle data and the third party data to a client device.

16. The system of claim 1, further comprising:
    at least one dynamometer unit that is disposed along each of the pair of elongated platforms, each of the at least one dynamometer unit comprising two rollers for capturing acceleration, torque and braking information from the vehicle located on the pair of elongated platforms, and
    wherein the at least one exterior camera is configured to capture the operation of each of the at least one dynamometer units simultaneously with capturing the image of the vehicle, and
    wherein the at least one exterior microphone is configured to capture audio information of the operation of each of the at least one dynamometer units.

17. The system of claim 16, wherein the controller is further configured to send the acceleration, torque and braking information from the vehicle, simultaneously with the captured vehicle data to the external device.

18. The system of claim 16, wherein one of the at least one exterior camera is configured to capture infrared images of the vehicle during an operation of each of the at least one dynamometer units.

19. The system of claim 16, wherein a length of each of the pair of elongated platforms is adjustable.

* * * * *